D. PARKER.
SIZER ADJUSTER.
APPLICATION FILED JAN. 30, 1917.
1,257,017.
Patented Feb. 19, 1918.
2 SHEETS—SHEET 1.
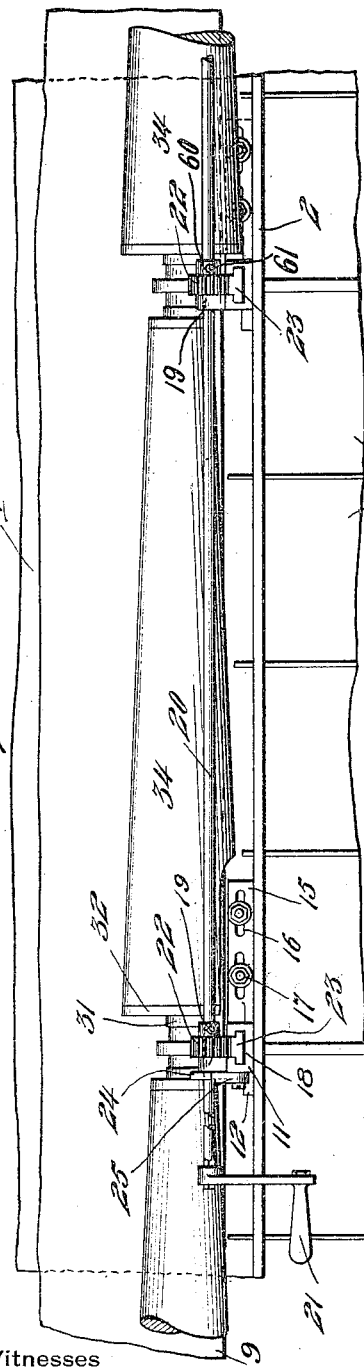
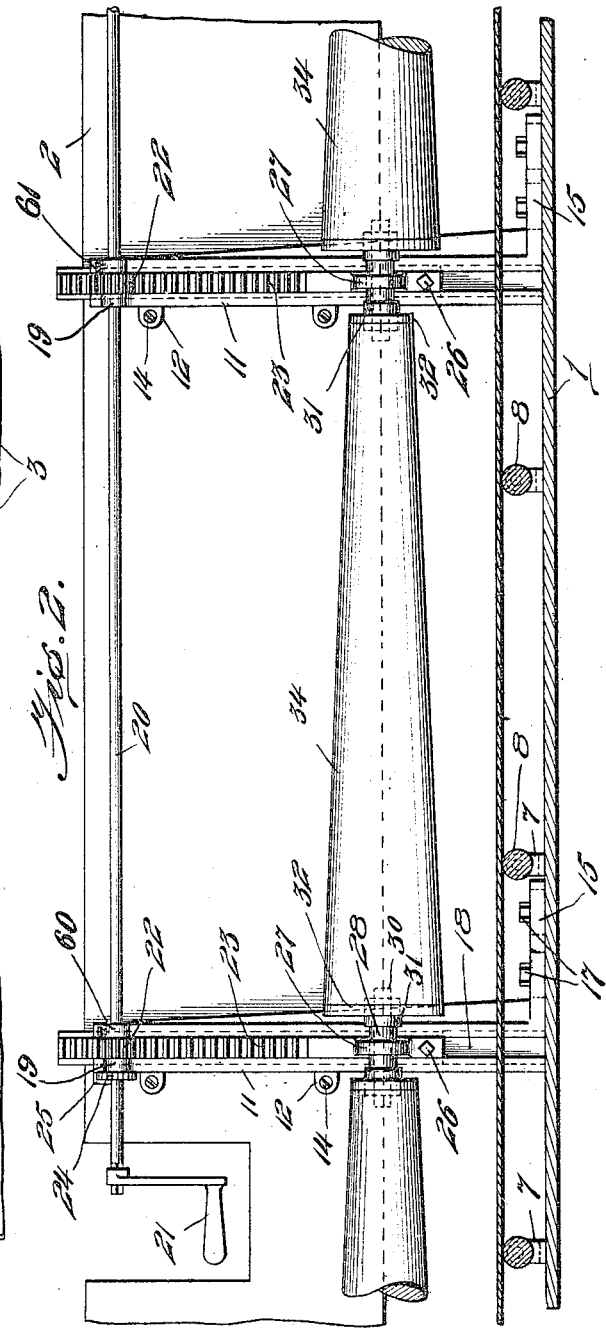
Witnesses
D. Parker, Inventor
by ———, Attorneys

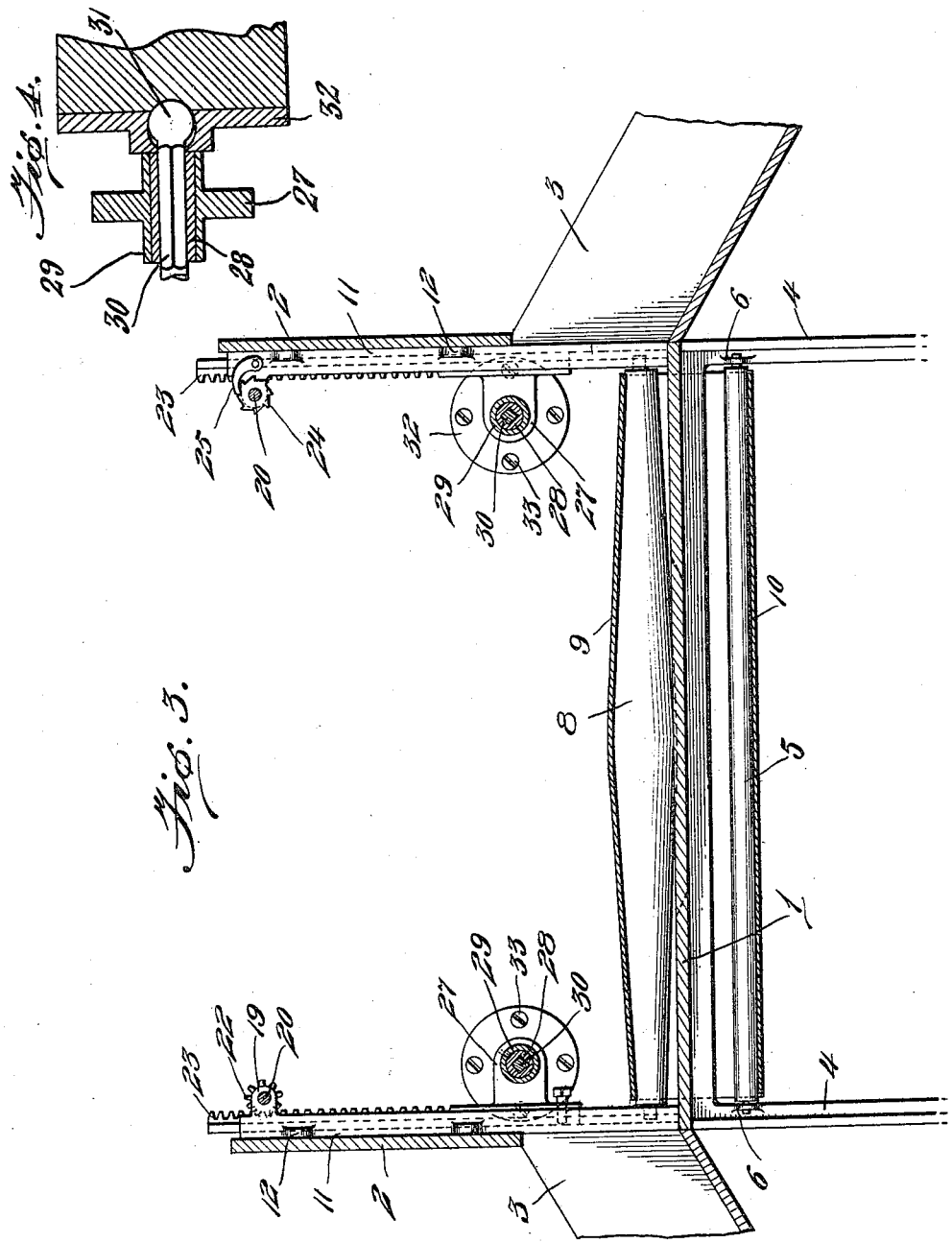

UNITED STATES PATENT OFFICE.

DONALD PARKER, OF TAMPA, FLORIDA.

SIZER-ADJUSTER.

1,257,017. Specification of Letters Patent. Patented Feb. 19, 1918.

Application filed January 30, 1917. Serial No. 145,500.

*To all whom it may concern:*

Be it known that I, DONALD PARKER, a citizen of the United States, residing at Tampa, in the county of Hillsborough and State of Florida, have invented a new and useful Sizer-Adjuster, of which the following is a specification.

This invention aims to provide novel means whereby some or all of the sizing rollers in a grading machine may be raised and lowered, thereby saving time in making changes in the size of the grade opening, to accommodate different kinds of fruit, or different kinds of the same fruit.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, a portion of a fruit grader constructed in accordance with the present invention, parts being broken away;

Fig. 2 is a vertical longitudinal section of the structure shown in Fig. 1;

Fig. 3 is a transverse section of a fruit grader embodying the present invention; and Fig. 4 is a fragmental elevation showing the means whereby the sizing rollers are mounted.

The device herein disclosed may be assembled with graders of widely different sorts, but in the drawings, there is shown one kind of a grader with which the device forming the subject matter of this application may be used. In the drawings, the fruit grader is shown as comprising a frame including a bottom 1 and side walls 2. Delivery chutes 3 open through the side walls 2. The frame may be supported on legs 4 carrying bearings 6 in which are journaled idle rollers 5 located below the bottom 1. Mounted on the bottom 1 are bearings 7 in which are journaled rollers 8, the same being located above the bottom 1. The rollers 8 preferably taper from their central portions toward their ends, and carry the upper run 9 of a belt conveyer, the lower run of which, denoted by the numeral 10, coöperates with the idle rollers 5. It will be obvious from Fig. 3 of the drawings, that when the fruit is carried along by the upper run 9 of the conveyer belt, the fruit, owing to the shape of the rollers 8, will tend to gravitate laterally into the delivery chutes 3.

The numeral 11 indicates standards provided with ears 12 receiving securing elements 14 whereby the standards may be attached to the side walls 2 of the frame. The standards 11 include feet 15 extended longitudinally of the frame, and provided with slots 16 receiving securing elements 17 engaged with the bottom 1 to aid in holding the standards in place. The standards 11 are equipped with vertical guide ways 18. At the upper ends of the standards 11, bearings 19 are formed. Journaled for rotation in the bearings 19 are shafts 20, each shaft being operated by any suitable means indicated at 21. The shafts 20 support pinions 22 meshing into rack bars 23 mounted to reciprocate vertically in the guide ways 18. The hubs 60 of the pinions 22 carry set screws 61 engaging the shafts 20. Secured to each of the shafts 20 is a ratchet wheel 24, adapted to be engaged by a pawl 25 carried by the standard 11. If desired, a set screw 26 may be threaded into each rack bar 23, near to the lower end thereof, the set screws 26 being adapted to engage the standards 11 at the bases of the guide ways 18. The rack bars 23 are provided with projecting lugs 27 carrying tubular bearings 29 in which bushings 28 are rotatable. Mounted in the bushings 28 against rotation are stub shafts 30 which are of polygonal cross section, the stub shafts being shown as square. The stub shafts 30, at their ends, are received at 31 in end plates 32 attached by means of securing members 33 to the ends of sizing rollers 34 which, preferably, are of the tapered construction shown in the drawings.

It will be obvious that by rotating the shaft 20, the pinions 22, meshing into the racks 23 will elevate the sizing rollers 34, or lower the sizing rollers, thereby to vary the size of the grading openings existing between the sizing rollers and the bottom 1. A reverse rotation of the shaft 20, and a consequent downward movement of the sizing rollers is prevented by the coaction between the ratchet wheel 24 and the pawl 25. In addition, the rack bars 23, and consequently the sizing rollers 34, may be held in adjusted positions by tightening up the set screws 26 which are threaded into the lower ends of the rack bars 23 and engage the standards 11.

Any of the set screws 61 may be loosened, and then the corresponding pinions 22 will not rotate when the shafts 20 are rotated, the rack bars 23 being held against vertical movement, by tightening up the set screws 26. In this way, some of the sizing rollers 34 may be raised and lowered, others of the sizing rollers being permitted to remain stationary, so far as vertical adjustment is concerned.

Having thus described the invention, what is claimed is:—

1. A fruit sizer or grader, one grading wall of which comprises a plurality of independently horizontally disposed interconnected sizing rolls arranged in alinement, and means for raising and lowering the said sizing rolls either selectively or simultaneously to vary the size of the grade opening controlled thereby.

2. A fruit grader, one grading wall of which comprises a plurality of independent sizing rolls interconnected at their ends and arranged in alinement, and means for raising and lowering all of said sizing rolls simultaneously to vary the size of the grade opening controlled thereby.

3. A fruit grader, one grading wall of which comprises a plurality of independent sizing rolls arranged in horizontal alinement, means for flexibly interconnecting said rolls at their adjacent ends, a bearing supporting each of said interconnecting means, and means for moving said bearings to simultaneously raise or lower the opposite ends of said sizing rolls the same distance to vary the grade opening controlled thereby.

4. A fruit sizer or grader, one grading wall of which comprises a plurality of independent sizing rolls arranged in alinement, means for flexibly interconnecting the said rolls at their adjacent ends, a bearing for each of said interconnecting means, a support for each of said bearings, a guide longitudinally of which said bearing supports are adjustable, and means coöperating with all of said supports for simultaneously adjusting the same to raise and lower said sizing rolls in unison to vary the respective grade openings controlled thereby.

5. A fruit sizer or grader, one grading wall of which comprises a plurality of independent sizing rolls arranged in alinement, means for flexibly interconnecting the said rolls at their adjacent ends, a bearing for each of said interconnecting means, a support for each of said bearings, a guide longitudinally of which said bearing supports are adjustable, means coöperating with all of said supports for simultaneously adjusting the same to raise and lower said sizing rolls in unison to vary the respective grade openings controlled thereby, and means for locking said rolls in their adjusted position.

6. A fruit sizer or grader, one grading wall of which comprises a plurality of independent sizing rolls arranged in alinement, means for flexibly interconnecting the said rolls at their adjacent ends, a bearing for each of said roll interconnecting means, a rack to which each of said bearings is attached, a guide longitudinally of which each of said racks is movable, a pinion coöperating with each of said racks, and a shaft interconnecting said pinions and capable of rotation for simultaneously adjusting said rolls to vary the respective grade openings controlled thereby.

7. A fruit sizer or grader one grading wall of which comprises a grading roll, a bearing rotatably supporting each end thereof, and means for simultaneously raising or lowering the opposite ends of said roll relatively to the other grading wall to vary the size of the grade opening controlled thereby.

8. A fruit sizer, the size openings of which are formed by the intervening space between the substantially parallel sizing walls, one sizing wall of which comprises a plurality of independent sizing roll units arranged end to end in longitudinal alinement, means for simultaneously varying the size openings formed between said sizing walls by the simultaneous adjustment of one of said walls as a unit relatively to the other, and means for independently varying the size openings formed between said sizing walls by the independent adjustment of the said sizing roll units relative to the other wall member.

In testimony that I claim the foregoing as my own, I have hereto affixed my signature in the presence of two witnesses.

DONALD PARKER.

Witnesses:
J. M. BINNICK,
J. P. GLENN.